United States Patent [19]

Kataoka

[11] Patent Number: 4,511,009

[45] Date of Patent: Apr. 16, 1985

[54] COMBINATORIAL WEIGHING APPARATUS AND METHOD

[75] Inventor: Koichi Kataoka, Shiga, Japan

[73] Assignee: Kabushika Kaisha Ishida Koki Seisakusho, Kyoto, Japan

[21] Appl. No.: 537,570

[22] Filed: Sep. 30, 1983

[30] Foreign Application Priority Data

Jan. 10, 1982 [JP] Japan .............................. 57-149852[U]

[51] Int. Cl.³ ........................ G01G 19/00; G01G 19/22
[52] U.S. Cl. ............................................ 177/1; 177/25
[58] Field of Search .......... 177/1, 25, 58, 72, DIG. 12

[56] References Cited

U.S. PATENT DOCUMENTS 3,215,173 11/1965 Rutherford ........................ 177/58 X
4,344,492 8/1982 Hirano ................................... 177/25
4,421,185 12/1983 Koto et al. .................... 177/DIG. 12

FOREIGN PATENT DOCUMENTS

WO83/02002 6/1983 PCT Int'l Appl. ......... 177/DIG. 12

Primary Examiner—E. A. Goldberg
Assistant Examiner—Patrick W. Foster
Attorney, Agent, or Firm—Staas & Halsey

[57] ABSTRACT

A combinatorial weighing system having a row of weighing hoppers provided on corresponding weighing machines, a plurality of tiltable pool trays provided diagonally above corresponding ones of the weighing hoppers, the pool trays being provided at a height where they can be viewed from outside the apparatus, and a collecting conveyor for collecting articles discharged from weighing hoppers belonging to a selected combination. A batch of the articles is placed in each of the pool trays, where the articles are temporarily retained. When a weighing hopper has discharged its articles, the corresponding pool tray is tilted to automatically resupply the weighing hopper with the articles retained by the tray.

8 Claims, 3 Drawing Figures

Fig. I
(PRIOR ART)

COMBINATORIAL WEIGHING APPARATUS AND METHOD

BACKGROUND OF THE INVENTION

This invention relates to a combinatorial weighing system and, more particularly, to an improvement in a method of supplying weighing hoppers with articles to be weighed, wherein a pool tray corresponding to each of a plurality of weighing hoppers is disposed between the weighing hopper and a supply table where articles are pooled in advance, articles received from the supply table are temporarily pooled on each of the pool trays, and those pool trays corresponding to emptied weighing hoppers that have discharged their articles in combination are actuated to automatically resupply the empty weighing hoppers anew.

A combinatorial weighing apparatus is designed to dispense batches of articles, each batch having a predetermined weight or a predetermined number of the articles. The apparatus, which includes a plurality of weighing machines, operates by weighing out small quantities of the articles using the weighing machines, each quantity having a slightly different weight value from the others, combining these weight values into a multiplicity of different combinations, or converting each weight value into the number of articles giving said weight value and then combining these article numbers into a multiplicity of combinations, adding the weight values or article numbers in each combination to obtain the corresponding sums, selecting the combination giving a sum equal to a preset weight or preset number, discharging the articles from the weighing machines corresponding to the selected combination, and collecting these discharged articles together into a single batch having the preset weight or preset number of articles. Such a weighing apparatus enables a highly accurate weighing operation to be carried out.

The construction of an automatic combinatorial weighing apparatus for performing such weighing is illustrated in FIG. 1. The combinatorial weighing apparatus includes a dispersing table 1 supported on an electromagnetic vibrating device 2 so as to be subjected to helical reciprocatory vibration, a plurality of supply troughs 3 disposed radially about the dispersing table 1, a plurality of electromagnetic vibrating devices 4 for vibrating corresponding ones of the supply troughs 3, a light-emitting device 5 supported on a post 6, and a light-receiving device 5' supported on a post 6', these devices serving to optically detect the quantity of articles accumulated on the dispersing table 1. The combinatorial weighing apparatus further includes a plurality of pool hoppers 7, each of which is situated below the distal end of a corresponding one of the supply troughs 3, a plurality of weighing hoppers 8 provided below corresponding ones of the pool hoppers 7, and a plurality of weighing machines 9, each supporting one of the weighing hoppers 8. Each pool hopper 7 is provided with a lever mechanism 10 for opening and closing the pool hopper, and each weighing hopper 8 is provided with a lever mechanism 11 for opening and closing the hopper. A drive mechanism 12 is provided for each pair of the hoppers 7, 8. The combinatorial weighing apparatus has a collecting chute 13 for collecting articles discharged from the weighing hoppers 8.

The automatic combinatorial weighing apparatus thus constructed operates as follows.

The articles are supplied automatically from the distributing table 1 through the supply troughs 3 into pool hoppers 7 and thence into the corresponding weighing hoppers 8. The articles thus received in the weighing hoppers 8 are weighed by the weighing machines 9 associated therewith. Based on the weights measured by the weighing machines 9, a control unit, not shown, combines the weight values into an arbitrary or predetermined number of combinations, computes the sum of the weight values in each combination, compares each sum with a preset weight, and selects the combination that gives a sum, total weight, equal to the target weight. The control unit then operates to open the weighing hoppers 8, which correspond to the selected combination, by the operation of the lever mechanisms 11 so that the articles are released into the collecting chute 13 from the weighing hoppers 8 to be collected together into a batch and discharged into a packaging machine or a bucket conveyor, not shown. This will leave the selected weighing hoppers 8 empty. Articles are then newly delivered from the corresponding pool hoppers 7, supplied with the articles in advance, into the empty weighing hoppers 8 by actuating the lever mechanisms 10, leaving these pool hoppers 7 empty, whereupon a new supply of articles is delivered from the dispersing table 1 and the corresponding supply troughs 3 by actuating the associated vibrating devices. The automatic combinatorial weighing operation can be continued in this manner by repeating the foregoing steps.

Thus, the articles are supplied to the weighing hoppers through the pool hoppers after accumulating temporarily on the dispersing table and in the supply troughs. Since the weighing machines are situated remote from the dispersing table, the articles dispensed by the dispersing table inevitably travel a long distance to reach the weighing hoppers. In consequence, articles such as chocolates or biscuits tend to be damaged by striking one another while in transit from the dispersing table to the weighing hoppers, resulting in a product of reduced commercial value. Moreover, viscous articles such as meats, pickles, fish and vegetables, as well as articles that are large in size and irregular in shape, have a greater opportunity of attaching themselves to the surface of the equipment when the path traversed is long. Obviously, articles that remain in the path of transit will not reach the weighing hoppers and, if such articles are large in size, eventual blockage of the path may result.

To prevent soft and delicate articles from being damaged or deformed, and to assure that large or viscous articles will be fed into the weighing hoppers in reliable fashion, a common arrangement adopted recently is to provide a supply table immediately above the weighing hoppers and introduce the articles into the weighing hoppers of the weighing machines directly from the table by a manual operation. Then, after a combinatorial weighing cycle is performed, the articles are discharged automatically into a collecting conveyor from the selected weighing hoppers. This arrangement is called semiautomatic combinatorial weighing apparatus, and it has been developed recently.

The foregoing arrangement has a number of drawbacks. Specifically, the supply table is mounted on a frame so as to overlay the plurality of weighing hoppers, which are provided on a machine frame, the table lying parallel to the weighing hoppers and extending to the outer side of each hopper. To load articles from the supply table into the inner reaches of the weighing hoppers, an operator must stand on a pedestal provided on the outside of the frame. Consequently, in order to detect, on the basis of a signal, the weighing hoppers that have been emptied by discharging their articles in a combinatorial weighing cycle, the operator, standing on the pedestal, must lean forward from above the supply table and confirm whether there are articles in the weighing hoppers located below the supply table. This is an extremely troublesome task. The ensuing task of loading articles into the emptied weighing hoppers by hand is also a difficult one for the operator. In performing this activity, moreover, the operator may inadvertently cause articles to fall from the supply table into weighing hoppers which, at the end of a weighing cycle, have yet to discharge their articles. This will cause articles to be packaged in excess of the prescribed weight or number.

SUMMARY OF THE INVENTION

An object of the present invention is to provide a combinatorial weighing apparatus and method through which articles can be loaded into weighing hoppers with facility and in an accurate manner.

According to the present invention, the foregoing object is attained by providing a combinatorial weighing system having a plurality of weighing hoppers provided on respective weighing machines, a supply table provided above the weighing hoppers for holding a supply of articles to be weighed, and a plurality of tiltable pool trays provided between the supply table and corresponding ones of the weighing hoppers. Articles taken from the supply table are placed on the pool trays manually, where the articles are temporarily retained. When a weighing hopper has discharged its articles, the pool tray corresponding thereto is tilted to resupply this weighing hopper with articles in automatic fashion.

Other features and advantages of the present invention will be apparent from the following description taken in conjunction with the accompanying drawings.

DESCRIPTION OF THE PREFERRED EMBODIMENT

Figure 1:
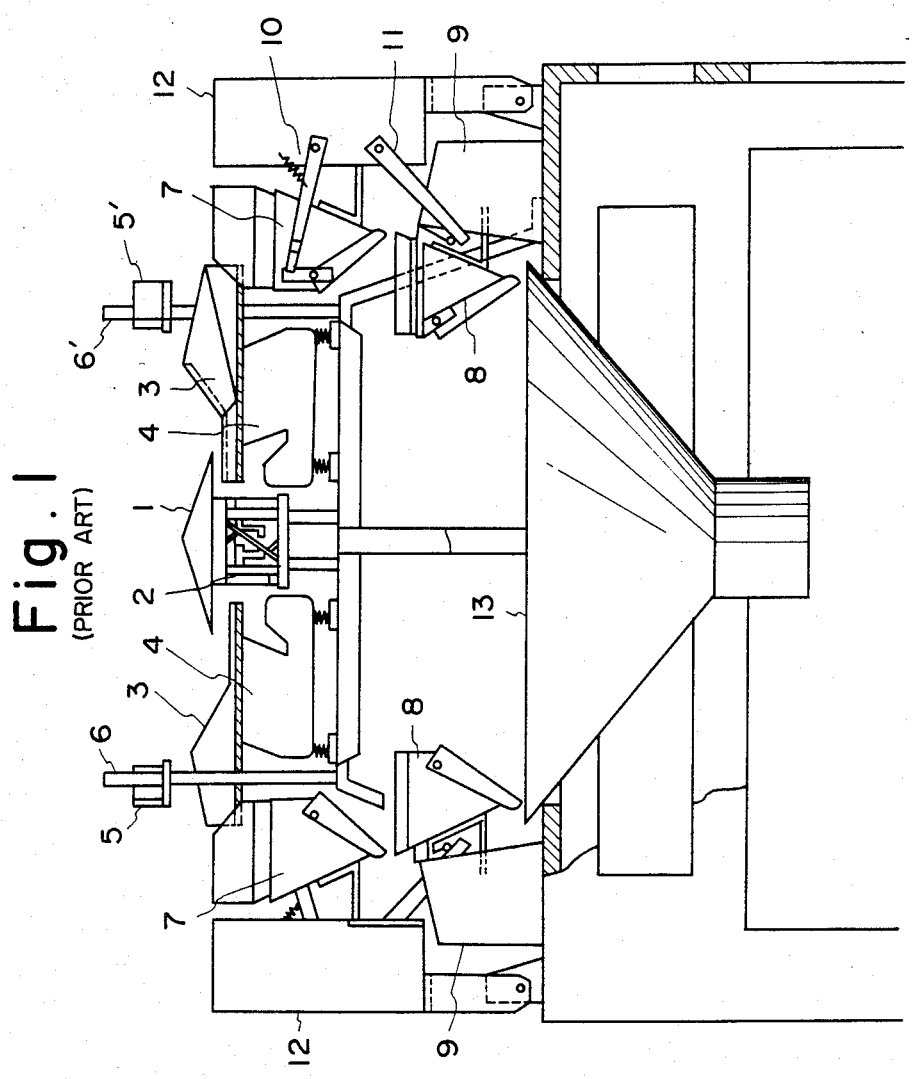
FIG. 1 is a schematic view showing the construction of an automatic combinatorial weighing apparatus according to the prior art.
Figure 2:
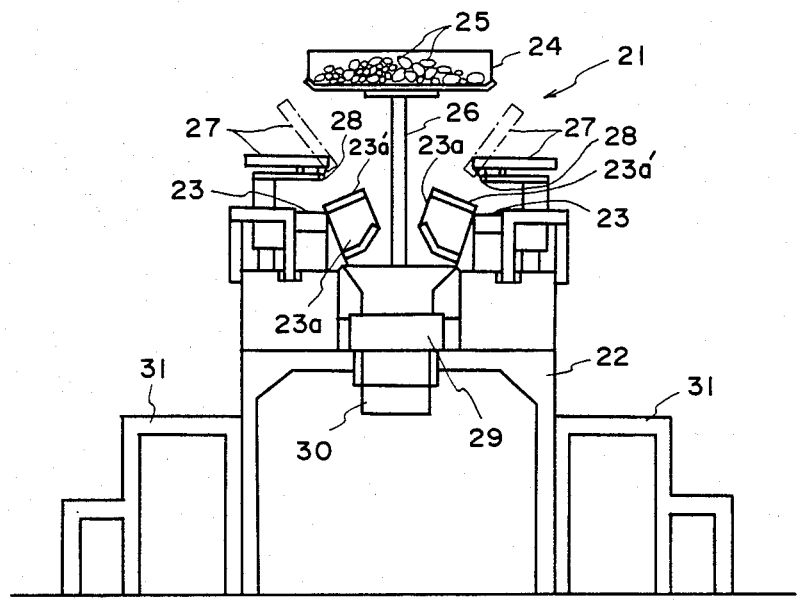
FIG. 2 is a side view showing an embodiment of a combinatorial weighing apparatus according to the present invention.
Figure 3:
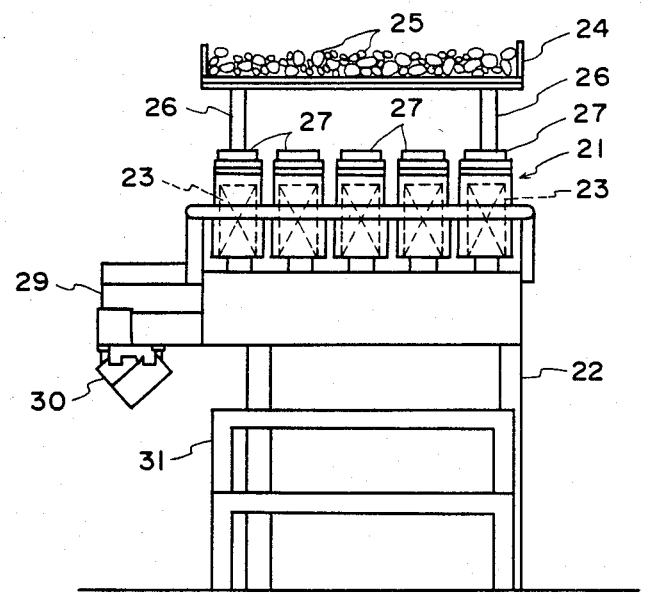
FIG. 3 is a front view of the apparatus shown in FIG. 2.

An embodiment of a combinatorial weighing apparatus according to the present invention will now be described in conjunction with FIGS. 2 and 3.

The combinatorial weighing apparatus, indicated at numeral 21, is provided on the upper part of a frame 22. The apparatus in the illustrated embodiment includes ten weighing machines 23 arranged in two opposing rows of five weighing machines each, the weighing machines in opposing rows confronting each other. Each weighing machine 23 has a weighing hopper 23a disposed substantially at the central portion of the frame 22. Numeral 24 denotes a supply table having an accumulation of articles 25. As illustrated in the drawings, the supply table 25 is supported above the center of the frame 22 by support columns 26 and is long enough to fully overlay the weighing machines in each of the two rows.

A pool tray 27 is provided between the supply table 24 and each weighing hopper 23a. Each pool tray 27 is located almost directly below the outer edge of the supply table 24, with the inward end of each tray being situated above the outer edge of the corresponding weighing hopper 23a, which is inclined toward the tray. Each pool tray 27 has its inward end pivotally attached to a shaft 28, about which the tray is capable of being tilted from the horizontal attitude shown by the solid lines to the inclined attitude indicated by the phantom lines, by drive means such as an air cylinder, not shown. Thus, each pool tray 27 may be directed toward the article-receiving opening 23a' of the corresponding weighing hopper 23a. A pedestal 31 is provided at the foot of the frame 22 and is high enough to permit an operator, who has mounted the pedestal, to view the surfaces of the pool trays 27 that receive the articles. The operator, standing on the pedestal 31, takes articles from the supply table 24 and places a suitable quantity of them manually on the pool trays 27, where the articles are temporarily retained. Then, when required, the trays 27 are tilted automatically to dump the articles into the underlying weighing hoppers 23a through the weighing hopper openings 23a'.

Each weighing hopper 23a proceeds to weigh the articles received from the corresponding pool tray, whereby a plurality of weight values are obtained. Then, by means of a computation control unit, not shown, these weight values are combined into a multiplicity of different combinations, or each weight value is converted into the number of articles giving said weight value and the numbers are combined into a multiplicity of combinations, the weight values or numbers in each combination are added to obtain the corresponding sum, the combination giving a sum equal to a preset weight or preset number is selected, and the weighing hoppers 23a of the weighing machines 23a corresponding to the selected combination are opened to discharge the articles.

Numeral 29 denotes a collecting conveyor provided below the weighing hoppers 23a of the two rows of weighing machines 23. The end of the conveyor toward which the articles are carried projects outwardly of the frame and terminates above the opening of a timing hopper 30. Articles 25 discharged from the weighing hoppers 23a to provide a batch of the preset weight or preset number fall onto the collecting conveyor 29 and are conveyed to the timing hopper 30 into which the articles fall from the conveyor 29. The article batch collected in the timing hopper 30 is discharged from the hopper at a suitable time in order to be packaged immediately or transferred to another conveyor for carrying the batch to a receptacle or packaging machine.

When the selected weighing hoppers 23a have discharged their articles, a command signal is produced for the purpose of discharging the articles from the pool trays 27 corresponding to these emptied weighing hoppers. In response to the discharge command signal, the drive means cause the proper pool trays 27 to tilt and dump their articles into the empty weighing hoppers 23a. Before this is carried out, however, the operator, standing on the pedestal 31, is capable of confirming visually whether the pool trays 27 corresponding to said weighing hoppers possess a collection of the articles 25. This visual checking operation can be performed very easily, and lamps or the like for the purpose of indicating when weighing hoppers are empty need not be provided. Confirming that the trays are holding articles assures that the empty weighing hoppers will be resupplied.

Another advantage of the invention is that articles held by the pool trays 27 participate in the next combinatorial weighing cycle only if the corresponding weighing hoppers 23a belong to the combination selected. Therefore, in comparison with the manual method of loading articles directly into the weighing hoppers, the present method of manually loading articles onto the pool trays takes place at longer intervals. There is enough time to perform the loading operation even while combinatorial weighing is in progress. This makes the manual loading operation much easier. In addition, since the rate at which empty weighing hoppers participate in combinations declines sharply, combinatorial weighing takes place with greater accuracy and a high processing capacity is maintained. Further, when articles are introduced directly into the weighing hoppers, as in the prior art, the operator may touch the adjoining weighing machine accidentally, thereby causing a weighing error or a shift in the zero point. The present invention eliminates this possibility.

Thus, in accordance with the present invention, articles on the supply table 24 are placed on the pool trays 27 disposed between the supply table and the corresponding weighing hoppers 23a of the weighing machines 23. After certain of the weighing hoppers 23a discharge their articles because these articles provide a combination of articles having a preset weight or preset number, only the pool trays 27 corresponding to these weighing hoppers, which will now be empty, are tilted to resupply the weighing hoppers with articles. The articles released from the selected weighing hoppers 23a are discharged onto the collecting conveyor 29, which proceeds to introduce the articles into the timing hopper 30. The resulting article batch, having the predetermined weight or number of articles, is then packaged. By repeating these steps, a large number of packaged products can be turned out one after another.

While the illustrated embodiment has the weighing machines arranged in two opposing rows, the same effects can be obtained even with a single row of weighing machines.

In accordance with the present invention as described and illustrated hereinabove, pool trays are provided between a supply table and the weighing hoppers of a plurality of weighing machines, articles are taken from the supply table and placed on the pool trays manually, and the prescribed trays are tilted when required to introduce their articles into the corresponding weighing hoppers. Unlike the prior-art arrangement, therefore, a long supply path is unnecessary so that delivery of the articles to the weighing hoppers may take place reliably and without mishap, even if the articles are fragile and readily deformable, highly viscous or large in size. Further, according to the invention, articles are transferred from the pool trays to the corresponding empty weighing hoppers automatically, and the pool trays can be readily observed from the outside by standing on a pedestal or the like. Since the pool trays are located at a height where the articles retained by them are in full view, the operator need not perform the troublesome task of leaning over the supply table to confirm whether articles are within the weighing hoppers, as the prior-art arrangement requires. With the present invention, articles may be loaded into the weighing hoppers without error. Also, the operation of placing the articles in the pool trays affords more time to spare and reduces the number of empty weighing hoppers, thereby raising the combinatorial weighing accuracy. Weighing errors attributable to operator mistake are eliminated.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing apparatus having a plurality of weighing machines each provided with a weighing hopper, wherein the weighing hoppers are supplied with articles, combinations are computed based on weight values provided by the weighing machines, and a selected combination of articles is discharged from the weighing hoppers, said apparatus comprising:
    weighing hoppers provided for respective ones of the plural weighing machines, said weighing hoppers being arranged in at least a single row;
    a plurality of tiltable pool trays located diagonally above corresponding ones of said weighing hoppers and provided at a height at which each can be viewed from outside the apparatus, said pool trays temporarily retaining a batch of received articles, wherein, after articles are discharged from selected weighing hoppers, the pool trays corresponding thereto are tilted to automatically resupply these weighing hoppers; and
    a collecting conveyor for collecting articles discharged from the selected weighing hoppers.

2. The combinatorial weighing apparatus according to claim 1, wherein said weighing hoppers are arranged in two rows.

3. The combinatorial weighing apparatus according to claim 1, further comprising a supply table located above the row of said weighing hoppers and having a length extending over the entire length of the row of said weighing hoppers.

4. The combinatorial weighing apparatus according to claim 2, further comprising a supply table located above both rows of said weighing hoppers and having a length extending over the entire length of each row of said weighing hoppers.

5. A combinatorial weighing method wherein a plurality of weighing hoppers provided on respective weighing machines are supplied with articles, combinations are computed based on weight values provided by the weighing machines, and a selected combination of articles is discharged from the weighing hoppers, said method comprising the steps of:
    temporarily retaining a batch of articles on each of a plurality of pool trays disposed above corresponding ones of the weighing machines, and
    automatically tilting pool trays corresponding to weighing hoppers left empty by discharging their articles, whereby the empty weighing hoppers are supplied with the articles from the tilted pool trays.

6. A combinatorial weighing apparatus comprising:
    a plurality of weighing machines;
    a weighing hopper associated with each of said weighing machines; and
    tiltable tray means located diagonally above each of said weighing hoppers, said tray means temporarily retaining a batch of received articles, wherein, after articles are discharged from a selected weighing hopper, the tray means associated therewith is tilted to automatically resupply the weighing hopper.

7. The combinatorial weighing apparatus according to claim 6, further comprising means for collecting articles discharged from said weighing hoppers.

8. The combinatorial weighing apparatus according to claim 6, further comprising a supply table located above said weighing machine.

* * * * *

UNITED STATES PATENT AND TRADEMARK OFFICE
CERTIFICATE OF CORRECTION

PATENT NO. : 4,511,009
DATED : April 16, 1985
INVENTOR(S) : Kataoka

It is certified that error appears in the above-identified patent and that said Letters Patent is hereby corrected as shown below:

(30) FRONT PAGE

"Jan. 10, 1982" s/b --Oct. 1, 1982--.

Signed and Sealed this

Thirteenth Day of August 1985

[SEAL]

Attest:

DONALD J. QUIGG

Attesting Officer   Acting Commissioner of Patents and Trademarks